United States Patent
Khoruzhenko et al.

(10) Patent No.: US 12,260,227 B2
(45) Date of Patent: *Mar. 25, 2025

(54) BINARY IMAGE PUBLICATION BY FIRMWARE

(71) Applicant: Absolute Software Corporation, Vancouver (CA)

(72) Inventors: Eugene Khoruzhenko, Redmond, WA (US); Jeffrey Michael Bush, Wylie, TX (US)

(73) Assignee: Absolute Software Corporation, Vancouver (CA)

( * ) Notice: Subject to any disclaimer, the term of this patent is extended or adjusted under 35 U.S.C. 154(b) by 230 days.

This patent is subject to a terminal disclaimer.

(21) Appl. No.: 17/687,896

(22) Filed: Mar. 7, 2022

(65) Prior Publication Data

US 2022/0197673 A1 Jun. 23, 2022

Related U.S. Application Data

(63) Continuation-in-part of application No. 16/769,185, filed as application No. PCT/CA2018/051575 on Dec. 11, 2018, now Pat. No. 11,269,606.

(Continued)

(51) Int. Cl.
*G06F 9/44* (2018.01)
*G06F 9/24* (2006.01)
(Continued)

(52) U.S. Cl.
CPC ........ *G06F 9/44505* (2013.01); *G06F 9/4406* (2013.01); *G06F 9/4401* (2013.01);
(Continued)

(58) Field of Classification Search
CPC .... G06F 9/4401; G06F 9/4406; G06F 9/4408; G06F 9/44505; G06F 21/572; G06F 11/1417

See application file for complete search history.

(56) References Cited

U.S. PATENT DOCUMENTS 6,615,404 B1 9/2003 Garfunkel et al.
9,612,846 B2 7/2017 Puthillathe et al.
(Continued)

FOREIGN PATENT DOCUMENTS

WO 01/06360 A2 1/2001

OTHER PUBLICATIONS

Arturo M. Garcia, Firmware Modification Analysis in Programmable Logic Controllers, 2014, [Retrieved on Sep. 12, 2024]. Retrieved from the internet: <URL: https://scholar.afit.edu/cgi/viewcontent.cgi?article=1602&context=etd> 94 Pages (1-94) (Year: 2014).*

(Continued)

*Primary Examiner* — Anibal Rivera
(74) *Attorney, Agent, or Firm* — Laurie Wright; Christopher N. Hunter; Blake, Cassels & Graydon LLP

(57) ABSTRACT

Multiple binary images stored in the firmware of an electronic device are written to the device's configuration tables during booting of the device, where one of the binary images is a manager binary. During booting, the manager binary is saved to the file system of the operating system such that it automatically executes upon completion of booting. The manager binary then deploys the other binary images.

20 Claims, 3 Drawing Sheets

Related U.S. Application Data

(60) Provisional application No. 62/598,319, filed on Dec. 13, 2017, provisional application No. 62/598,095, filed on Dec. 13, 2017.

(51) Int. Cl.
    *G06F 9/4401*     (2018.01)
    *G06F 9/445*     (2018.01)
    *G06F 21/56*     (2013.01)
    *G06F 11/14*     (2006.01)
    *G06F 21/57*     (2013.01)

(52) U.S. Cl.
    CPC ........ *G06F 9/4408* (2013.01); *G06F 11/1417* (2013.01); *G06F 21/572* (2013.01)

(56) References Cited

U.S. PATENT DOCUMENTS

| | | |
|---|---|---|
| 9,721,101 B2 | 8/2017 | Jones et al. |
| 10,402,204 B1 | 9/2019 | Yakovlev et al. |
| 10,664,262 B2 | 5/2020 | Zimmermann et al. |
| 10,740,109 B2 | 8/2020 | Roszak et al. |
| 2009/0327741 A1 | 12/2009 | Zimmer et al. |
| 2010/0122077 A1 | 5/2010 | Durham |
| 2011/0131447 A1 | 6/2011 | Prakash et al. |
| 2012/0124357 A1 | 5/2012 | Zimmer et al. |
| 2015/0242221 A1 | 8/2015 | Tsirkin |
| 2017/0024313 A1* | 1/2017 | Tsirkin .................... G06F 21/52 |
| 2018/0276000 A1* | 9/2018 | Roszak ................. G06F 9/4401 |
| 2018/0276001 A1* | 9/2018 | Roszak ................... G06F 9/452 |
| 2018/0276002 A1 | 9/2018 | Roszak et al. |
| 2018/0276386 A1* | 9/2018 | Roszak ................. G06F 9/4416 |
| 2019/0005058 A1 | 1/2019 | Oganezov et al. |
| 2019/0065171 A1 | 2/2019 | Zimmerman et al. |

OTHER PUBLICATIONS

Kruegal, C. et al.; "Detecting Kernel-Level Rootkits Through Binary Analysis"; Proceedings of the 20th Annual Computer Security Applications Conference (ACSAC'04); IEEE 2004; retrieved Oct. 27, 2021 from the internet https://ieeexplore.ieee.org/stamp/stamp.jsp?tp=&arnumber=1377219>10; pp. 1 to 10; 2004.

Hoffman, Chris; "Zombie Crapware: How the Windows Platform Binary Table Works"; Aug. 19, 2015; retrieved Mar. 20, 2019 from howtogeek.com.

Xu, Herbert; git.kernel.org; 2016.

Ionescu, Alex; "ACPI 5.0 Rootkit Attacks "Againts" Windows 8"; SyScan; 2012; Crowd Strike.

Yosifovich et al.; "Part 1 System Architecture, Processes, Threads, Memory Management and More"; 2017; Microsoft.

Weksteen; ACPI Table Implants; Google; available at least as early as Jun. 2020.

Windows Platform Binary Table (WPBT); Jul. 9, 2015; Microsoft.

Office Action issued in connection with Japanese Application No. 2020-531623; Feb. 2022.

Office Action issued in connection with Japanese Application No. 2022-82910; May 2023.

MacKinnon, David; International Search Report issued in connection with PCT Application No. PCT/CA2018/051575; search completed Jan. 16, 2019.

\* cited by examiner

BINARY IMAGE PUBLICATION BY FIRMWARE

CROSS-REFERENCE TO RELATED APPLICATIONS

This application is a Continuation-in-Part of U.S. application Ser. No. 16/769, 185, now U.S. Pat. No. 11,269,606, which is a national stage entry of PCT Application No. PCT/CA2018/051575 filed on Dec. 11, 2018, which claims priority from Provisional Application No. 62/598,095 filed on Dec. 13, 2017 and Provisional Application No. 62/598, 319 filed on Dec. 13, 2017, all of which are incorporated herein by reference in their entireties.

TECHNICAL FIELD

This application relates to the field of publishing binary images from firmware. In particular, it relates to the publishing of multiple binary images from firmware to an operating system environment.

BACKGROUND

To date, Absolute Software has used various methods of deploying its agent into an operating system (OS). One of these methods is the use of the current implementation of Windows® Platform Binary Table (WPBT), which allows for only one binary image to be published by firmware to Windows® for execution. Traditionally, this binary was Absolute's agent. The firmware builds tables of system information during boot, which are used by the operating system to determine, for example, what hardware is installed. One of the tables includes information about an executable embedded in the firmware. During boot, the operating system looks for this table, and, if present, copies the executable into the file system and runs it.

SUMMARY

It has become desirable for Absolute to provide a method for loading other images as well as its own. The presently disclosed method permits a binary table, which is configured to hold information about a single publishable executable, to generate multiple published binaries during booting of an operating system. In particular, this document discloses an extension to WPBT that adds support for publishing more than one binary image by firmware for execution by Windows® and other operating systems. Using this extension, an OEM (Original Equipment Manufacturer) is able to include its own binary image alongside the image of the Absolute® Persistence® Agent or any other software agent. The end-customer then has the option to purchase client software that takes advantage of any, all or none of the agents or binary images listed within the extension. In other embodiments, an equivalent to the WPBT or alternate method may be used, via which a first binary image is deployed from firmware. The first binary image, i.e. the manager binary image, then deploys one or more secondary binary images that originated in firmware.

Disclosed is a method for publishing multiple binary images from firmware in an electronic device to an operating system in the electronic device, the method comprising, during booting of the electronic device, the steps of: installing a first binary image, which is stored in the firmware, into a configuration table in the electronic device; installing a second binary image, which is stored in the firmware, into the configuration table; and saving a copy of the first binary image in a file system of the operating system; and after the operating system has started loading, the step of executing the copy of the first binary image to deploy the secondary binary image.

Also disclosed is an electronic device that publishes multiple binary images, the electronic device comprising a processor, an operating system and firmware storing computer readable instructions, which, when executed by the processor cause the electronic device, during booting of the electronic device, to: install a first binary image, which is stored in the firmware, into a configuration table in the electronic device; install a second binary image, which is stored in the firmware, into the configuration table; and save a copy of the first binary image in a file system of the operating system; and, after the operating system has started loading, execute the copy of the first binary image to deploy the secondary binary image.

DETAILED DESCRIPTION

A. Glossary

ABT—Absolute Software

ACPI—Advanced Configuration and Power Interface, an industry specification for the efficient handling of power consumption in desktop and mobile computers. ACPI specifies how a computer's basic input/output system, operating system, and peripheral devices communicate with each other regarding power usage. ACPI defines tables that provide the interface between an ACPI-compliant operating system and system firmware. The tables allow for the description of system hardware in a platform-independent manner, and are presented as either fixed-formatted data structures or in AML (ACPI Machine Language).

API—Application Programming Interface

BIOS—Basic Input/Output System. This is firmware used for hardware initialization during the booting process of an electronic device, and for providing runtime services for operating systems and programs.

Deploy—to generally use or do something with a binary image, such as to launch it as an executable, to save it to a file system for launch by an OS, to store it without launching (e.g. if the binary is a set of registry entries), etc.

DXE—Driver Execution Environment

FAT—File Allocation Table

NTFS—New Technology File System

OEM—Original Equipment Manufacturer

OS—Operating System

Platform Extension Manager—A Windows® native user-mode application (PlatExtMgr.exe, wpbbin.exe) that is pointed at by WBPT. The native user-mode application is built in an SDK as PlatExtMgr.exe. As it is published by WPBT, it becomes a binary buffer in memory with no name. When Windows® finds the WPBT and then this binary buffer, Windows® saves the buffer as file wpbbin.exe, as per Microsoft's WPBT specification. When run, this application finds XPBT tables and installs binaries referenced by those tables.

RAM—Random Access Memory, often used as the main, volatile memory of a computing device.

RPC—Remote Procedure Call

RSDT—Root System Description Table

SDK—Software Development Kit

SHA—Secure Hash Algorithm

UEFI—Unified Extensible Firmware Interface, a specification that defines a software interface between an operating system and platform firmware. The UEFI is stored as firmware in non-volatile memory.

WPBT—Windows Platform Binary Table

XPBT—Extended Platform Binary Table. An XPBT can accommodate multiple nodes.

XSDT—Extended System Description Table

B. Exemplary Embodiment

Figure 1:
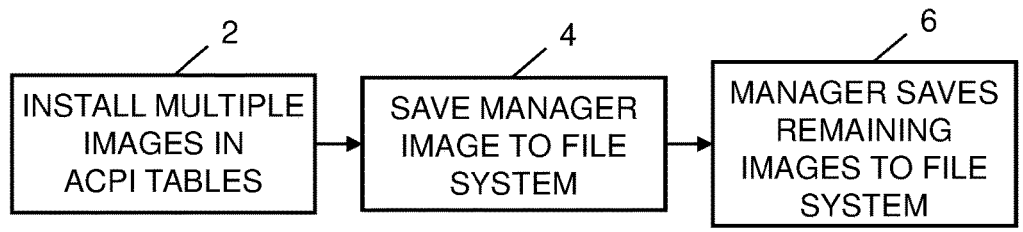
FIG. 1 is an overview of the main steps of the process for publishing multiple binaries, according to an embodiment of the present invention.

Referring to FIG. 1, the main steps in the process are shown in the form of a flowchart. In step 2, multiple binary images are installed in the ACPI tables during the booting of a computer, where one of the binary images is a manager binary. In step 4, still during booting, the manager binary is saved to the file system of the operating system. At some point, early in the loading process of the OS, the OS executes the manager binary, which saves the other binary images to the OS file system in step 6. A more detailed flowchart is described below.

Figure 2:
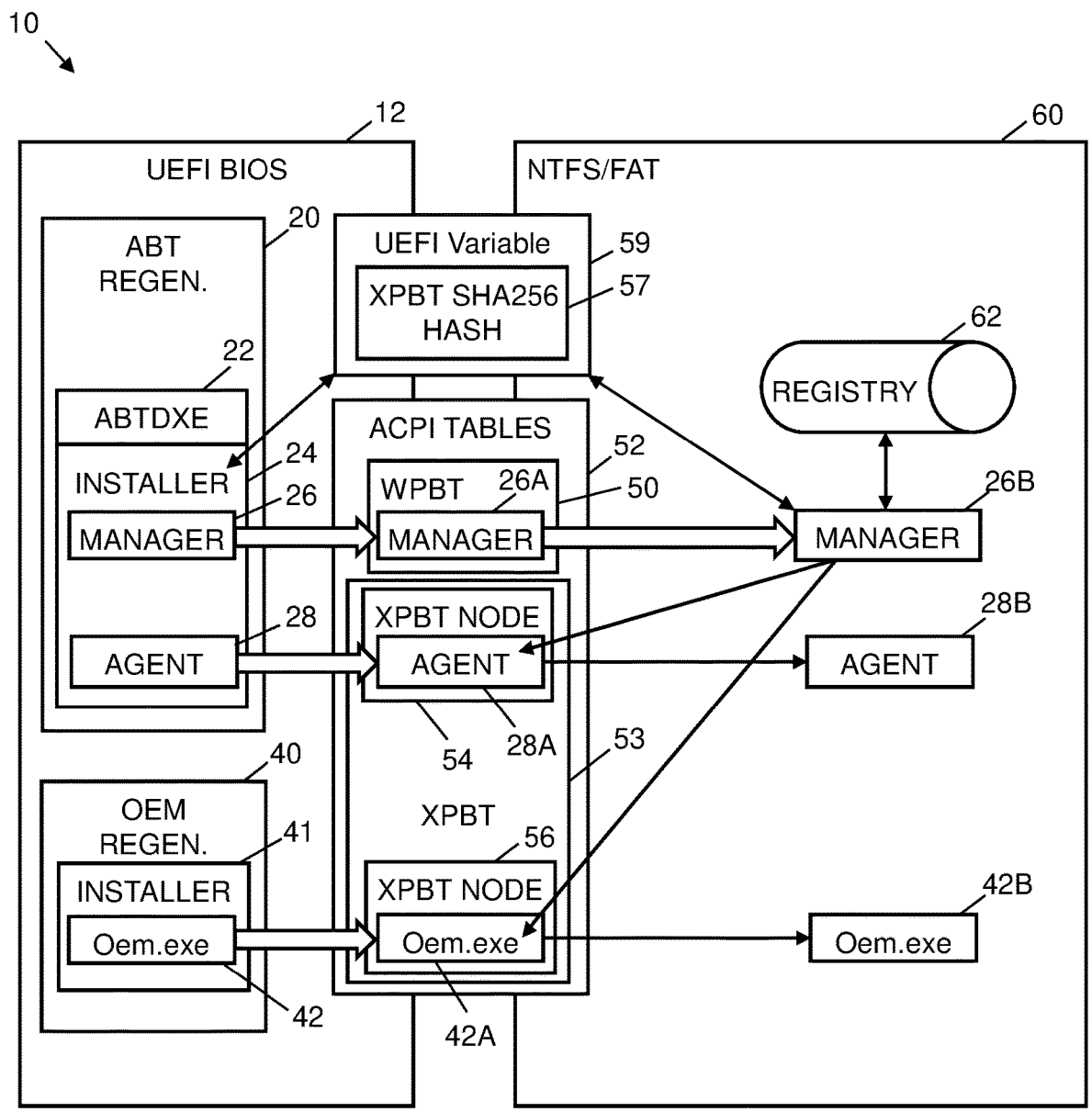
FIG. 2 is a schematic block diagram of a system showing the execution and code flow for publishing multiple binary images, according to an embodiment of the present invention.

Referring to FIG. 2, a system 10 is shown for publishing multiple binaries from firmware 12, such as UEFI BIOS, to the operating system of a computing device.

A first regenerative module, (e.g. ABT Persistence®) 20, is stored in the firmware 12. The regenerative module 20 includes a DXE driver, AbtDxe 22, which is a security module that is able to contact a server that is remote from the computing device. Also included in the regenerative module 20 is an installer 24 (AbtAgentlnstaller), which itself includes a platform extension manager binary image 26 (PlatExtMgr.exe) and the agent 28 (AbtAgent). The driver 22 runs on booting of the device and triggers operation of the installer 24.

A second, OEM regenerative module 40 is also stored in the firmware 12. The OEM regenerative module 40 in turn includes a second installer 41 and binary Oem.exe 42. The OEM regenerative module 40 also runs automatically upon booting the device.

The manager binary image 26 is installed into WPBT 50 by the installer 24 (AbtAgentlnstaller), where it is shown as a copy 26A of manager binary image 26.

The XPBT (Extended Platform Binary Table) 53, with XPBT node 54 for the OS agent 28A is created by the installer 24, along with the creation of the WPBT 50. All other XPBT nodes are created using separate OEM or third party installers that run in the UEFI BIOS 12. For example, there is one installer 24 in the ABT regenerative module 20 and another installer 41 in the OEM regenerative module 40. The ABT regenerative module 20 is required for the OEM regenerative module 40 to be able to install the Oem.exe agent. It is therefore possible for different entities to update and/or extend the XPBT 53 to insert their own respective portions.

During Windows® boot, the manager binary image 26A pointed at by WPBT is saved as a further copy 26B (wpbbin.exe) of the platform extension manager binary image 26 and is executed by Windows® as usual. No additional binary images can be executed by Windows® in this way.

Each valid XPBT payload binary, including the OS agent 28A and OEM agent Oem.exe 42A, is saved to the OS file system 60. The platform extension manager 26B checks to make sure that the payload binary 28A, 42A is for the particular OS, and verifies the integrity of the XPBT 53 before processing it. An XPBT SHA256 hash 57 of the XPBT 53 is calculated by the installer 24 in the UEFI BIOS 12 and saved in read-only UEFI variables 59, which the platform extension manager 26B reads to verify the integrity of the XPBT. The calculation of the hash 57 is triggered by the AbtDxe driver 22, after the various entities have inserted their particular XPBT nodes 54, 56 into the XPBT 53, so that the XPBT integrity can be verified later by the platform extension manager 26B.

An API is provided in the AbtDxe driver code that allows the various entities to insert their XPBT nodes 54, 56 into the XPBT 53. As such, the OEM installer 41 must either start to execute after the installer 24 has started, or, if starting beforehand, it must wait for installer 24 to have created the XPBT 53. The agent 28A is saved as agent 28B, and the Oem.exe 42A is saved as Oem.exe 42B. The XPBT install data is used to update the OS registry 62, resulting in the execution of the XPBT binaries, i.e. agent 28B and Oem.exe 42B.

Figure 3:
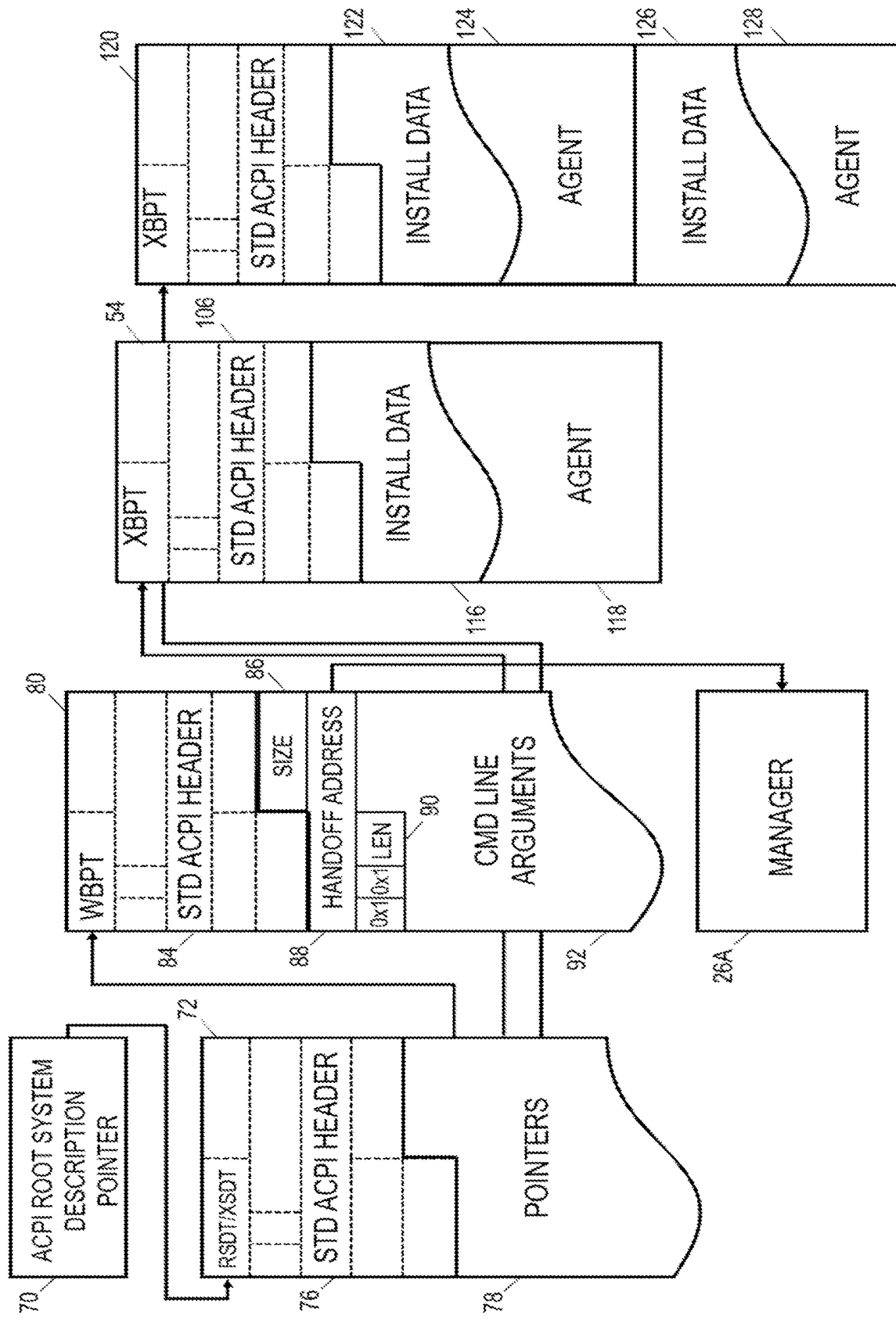
FIG. 3 is a schematic diagram illustrating the data structures of the XPBT and other ACPI tables and their interrelation, according to an embodiment of the present invention.

FIG. 3 illustrates the data structures of the WPBT, XPBT and other ACPI tables. The ACPI root system description pointer 70 points to the RSDT (root system description table) or the XSDT (extended system description table) 72, which includes a standard ACPI header 76 and pointers 78. The pointers 78 point to the ACPI tables, which include a WBPT 50 and one or more differently-named XBPTs 110, 120. The WBPT 50 includes a standard ACPI header 84, a handoff size 86, a handoff address 88, a command length 90 and command line arguments 92 for running the platform extension manager binary image 26B. The handoff address points to the platform extension manager binary image 26A.

There are two examples shown of XPBTs 110, 120. Generally, only XPBT 120 is used as it has multiple nodes, but there may be zero, one or more of each type of table depending on the embodiment implemented. XPBT 110, which has one binary, includes a standard ACPI header 106, install data 116 and a binary image of an agent 118. The install data 116 is used by platform extension manager 26B to launch the corresponding XPBT payload binary 118. The XPBT 120, which is for multiple binaries, includes install data 122, a binary image of an agent 124, further install data 126, and a further binary image of another agent 128.

XPBT install data 116 includes the location where the binary 118 is to be saved and the necessary changes to the registry so that the binary 118 is executed as part of the normal OS boot process. The OS is relied on to verify the signature before the OS executes the binary 118. The payload buffer (e.g. binary image 118) is made to directly follow the XPBT 110, and the table size is adjusted to include the payload buffer. This way the API returns the whole thing, i.e. the table 110 and its corresponding binary image 118.

Likewise, install data 122 includes the location where the binary 124 is to be saved and the necessary changes to the registry so that the binary 124 is executed as part of the normal OS boot process. The same applies to install data 126 and binary 128. The first payload buffer (e.g. binary image 124) is made to directly follow the XPBT 120, the second install data 126 and payload buffer (e.g. binary image 128) are made to directly follow the first payload buffer 124. The table size is adjusted to include the payload buffers. This way the API returns the whole thing, i.e. the table 120 and its corresponding binary images 124, 128.

TABLE 1 shows an example of an XPBT 53. The XPBT entries 53 in the ACPI tables 52 are similar to that of WPBT. Multiple XPBT node entries 54, 56 can exist in the ACPI tables 52. TABLES 1-5 provide a detailed definition of an exemplary XPBT entry. TABLE 2 gives examples of images flags present in the XPBT. TABLE 3 gives example values of the image flag labelled CPU Type. TABLE 4 gives example values of the image flag labelled OS Type. TABLE 4 gives example values of the image flag labelled Image Type.

TABLE 1

| Field | Byte Length | Byte Offset | Description |
|---|---|---|---|
| ACPI Header | | | |
| Signature | 4 | 0 | 'XPBT' Signature |
| Length | 4 | 4 | Length in bytes |
| Revision | 1 | 8 | 1 |
| Checksum | 1 | 9 | Entire table must sum to zero |
| OEMID | 6 | 10 | OEM ID |
| OEM Table ID | 8 | 16 | The manufacture model ID |
| OEM Revision | 4 | 24 | OEM revision |
| Creator ID | 4 | 28 | Vendor ID of utility that created the table |
| Creator Revision | 4 | 32 | Revision number of utility that created the table |
| XPBT Specific | | | |
| Image Size | 4 | 36 | Binary image size |
| Image Address | 8 | 40 | Address of binary image |
| Image Flags | 2 | 48 | Image Flags (See Table 2) |
| Install Data Len | 2 | 50 | Install data length |
| Install Data | Variable | 52 | Install data |

TABLE 2

| XPBT-Flags | Bit Length | Bit Offset | Description |
|---|---|---|---|
| Binary Valid | 1 | 0 | Binary Image is valid and should be executed if object type is supported by the OS |
| Reserved | 3 | 1 | |
| CPU Type | 4 | 4 | See Table 3 |
| OS Type | 4 | 8 | See Table 4 |
| Image Type | 4 | 12 | See Table 5 |

TABLE 3

| Flags-CPU Type | Description |
|---|---|
| 0 | x86 |
| 1 | x86_64 |
| 2 | Arm Arch32 |
| 3 | Arm Arch64 |
| 4-15 | Reserved |

TABLE 4

| Flags-OS Type | Description |
|---|---|
| 0 | Windows |
| 1 | Linux |
| 2 | Android |
| 3 | Mac OS |
| 4 | iOS |
| 5-15 | Reserved |

TABLE 5

| XPBT-Content Type | Description |
|---|---|
| 0x01 | PE COFF 32 bit |
| 0x02 | PE COFF 64 bit |
| 0x03 | ELF 32 bit |
| 0x04 | ELF 64 bit |
| 0x05-0x0F | Reserved |

TABLES 1-5 are only an example implementation, to show how multiple binary images can be supported, and other implementations are possible.

Figure 4:
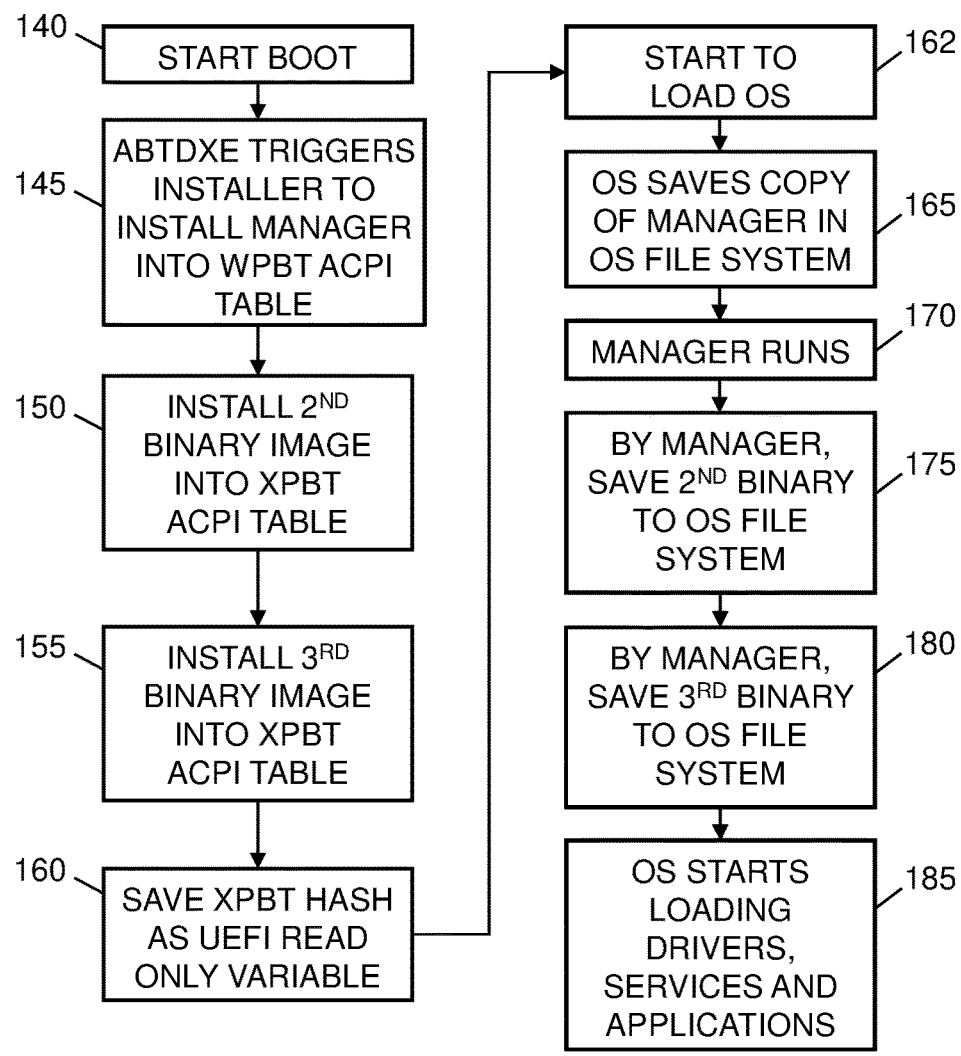
FIG. 4 is flowchart of the steps of a process for publishing multiple binaries, according to an embodiment of the present invention.

Referring to FIG. 4, a process that is undertaken to publish multiple binaries in an electronic device is shown. The process is performed by one or more processors in the electronic device, executing computer-readable instructions that are stored in computer-readable memory in the device. First, the computer or other electronic device is booted, and in step 140, the electronic device starts to boot. In step 145, during the booting process, the firmware of the electronic device installs the first binary image, of a set of multiple binary images, into the ACPI tables. The first binary image is, in this case, the manager image 26, which is installed into the WPBT ACPI table by the installer 24, which is triggered by the AbtDxe driver 22. In step 150, still during the booting process, the firmware installs the second binary image 28 into the ACPI tables. In step 155, and still during the booting process, the firmware installs the third binary image 42 into the ACPI tables.

In step 160, the firmware saves a hash 57 of the binary images as a UEFI read only variable. In step 162, the OS starts to load. In step 165, during loading of the OS, the copy of the manager image 26A that has been installed in the ACPI tables is then saved in the file system of the operating system. At some point, still early in the OS boot process, in step 170, the manager 26B that has been saved to the OS file system is executed. The manager 26B, when executed, saves the second binary 28B to the OS file system in step 175, and saves the third binary 42B to the OS file system in step 180. In step 185, the OS starts loading the drivers, services and applications, and eventually the desktop is ready for display.

As a result, both binaries 28B and 42B are running and have been published from the firmware to the OS.

As described, the XPBT will work with all existing versions of Windows® 8/10 and help provide the transition to an XPBT-only model.

C. Variations

While the invention has been described in relation to ABT and OEM regenerative modules, other modules from other sources may be used, provided that they function in a similar way.

The XPBT signature and XPBT ACPI table layout is implementation specific. The XPBT signature could be anything as long as the platform extension manager knows what to search for. The XPBT layout could be anything as long as the platform extension manager knows how to parse it. The ACPI signature in other embodiments is therefore different from XPBT with the table layout defined in relation to TABLE 1.

The overall goal is to support loading multiple binary images from the ACPI tables. This is accomplished by having multiple binary images in an XPBT, or having multiple XPBT tables with one image each, or a combination of the two, i.e. multiple XPBT tables with one or more binary images in each table.

Other configuration tables instead of ACPI tables may be used in other embodiments.

The binary image payloads can be services, applications or drivers.

It is also conceivable that the invention may be embodied in relation to other operating systems, i.e. it is possible to make the XPBT specification OS agnostic and support other OS types in addition to Windows®.

D. Further Embodiments

In one embodiment, the manager binary image 26B, when executed, is configured to save a copy of the agent binary image 28B in the file system and then launch it directly, without having to wait for the OS to launch it. The agent binary image 28, 28A, 28B may be referred to as a secondary binary image. In some embodiments, there may be more than one binary image other than the manager binary image, which may also be referred to as secondary binary images. The manager binary image 26B, when executed, may then be configured to launch one, some or all of the secondary binary images directly, without having to wait for the OS to launch them. When launching the agent binary image or any one of the other secondary binary images, they may be launched, for example, as child processes of the manager binary image.

In another embodiment, the manager binary image 26B, when executed, does not copy the agent binary image 28A or one or more of the other secondary binary images 42A from the configuration table to the file system. Instead, the manager binary image 26B, when executed, launches these secondary binary images 28A, 42A directly from the configuration table, i.e. from the main memory (RAM) of the electronic or computing device. When launching any of the secondary binary images directly from RAM, they may be launched, for example, as child processes of the manager binary image. In this case, a reason to put all the binary images into one XPBT table is that when the binary images are executed by the OS, access to the area of RAM where the images are located is provided. The manager code can allocate more RAM if required, and copy the images there, e.g. for execution. When a process exits, memory (RAM) contents will be freed, however, the binary images launched may either exit or remain running for the entire user session (e.g. until the device is rebooted or switched off).

In some embodiments, there may be a chain of steps. For example, the first binary image, i.e. the manager binary image 26B copies a second binary image into memory (RAM) to execute directly. While the second binary image is already in RAM, its memory attribute is Data, and is therefore allocated for read/write and not execution. The first binary image allocates memory for execution, copies the second binary image there and then requests the OS to start the second binary image as a process. When the second binary image executes, it initiates a network connection from the electronic device to a server. The server then uses an RPC to load and launch another secondary image remotely. This other secondary image may be downloaded from the server, and other secondary images may also be downloaded.

The secondary binary images do not have to be executable code, but instructions to execute other existing components, i.e. they may be scripts, registry entries or some configuration data. The secondary binary images may be deployed by a variety of means, such as by the OS, by the manager binary image, or by other executing components.

The main requirement is that the manager binary image, which is launched by the OS in a pre-defined way, then deploys other, secondary images that are described in the image install data. The result is that multiple binary images, i.e. a manager binary and at least one other secondary image, are transferred from the firmware to the main memory (RAM) and deployed. The transfer and deployment of the multiple binary images is achieved by using and adding to a tool that is configured to execute and deploy only one binary image initially stored in the firmware.

In some embodiments, there are multiple OSes on the electronic device. There can be either one of those different OSes installed on this device, or it may be a multi-boot configuration, where several OSes are installed at the same time and the one to boot is selected from the Boot Menu. In order to account for multiple OSes the proper Manager and Agents are included for all the OSes to be supported. Then, depending on which OS is currently loading, the proper Manager is started by the OS that is loading. The Manager then in turn picks Agent versions (i.e. secondary binary images) that are marked with the OS Type flag for the OS that is loading. Binary images for other OSes that are not loading are ignored. Each configuration table and each manager image is specific to a different OS type (Windows®, Linux®, etc.). It is possible that the implementor organizes configuration tables per OS, or one table per agent, or all Agents and Managers packed into the same table. During booting, each manager binary image is deployed, as well as all the secondary binary images being installed in their corresponding configuration tables. When a specific OS is launched, only the corresponding manager binary image for that specific OS is launched. The manager image may be built into the OS kernel (e.g. a Linux® kernel), for example, or it may be copied into the OS's file system during boot, via a configuration table, or the manager may start from a separate partition or RAM drive. The manager image then finds and deploys the other, secondary images marked for the specific OS. The manager images corresponding to the other OSes, which are not launched, are ignored.

In some embodiments, it may be possible for the firmware module to detect the currently selected OS out of multiple OSes that are present, so that only the corresponding binaries are loaded into the configuration table(s). However, methodologies should be put in place to ensure reliability.

There may be cases where multiple OSes run on the device at the same time and the user can switch between them. This involves a primary (or host) OS and guest OSes running in VMs (virtual machines) of the host OS. In this case, the guest OSes do not need to know that they run in VMs and the host can replicate the same set of configuration tables for the guest OSes, so a guest OS, depending on its type, would launch images for its own type. In the case of VMs, the guest OSes follow the same path described herein as the host OS. In a VM case with host/guests, it is simpler to publish all tables and images for all the guest OSes, and allow each guest to only deploy what is appropriate for itself.

Figure 5:
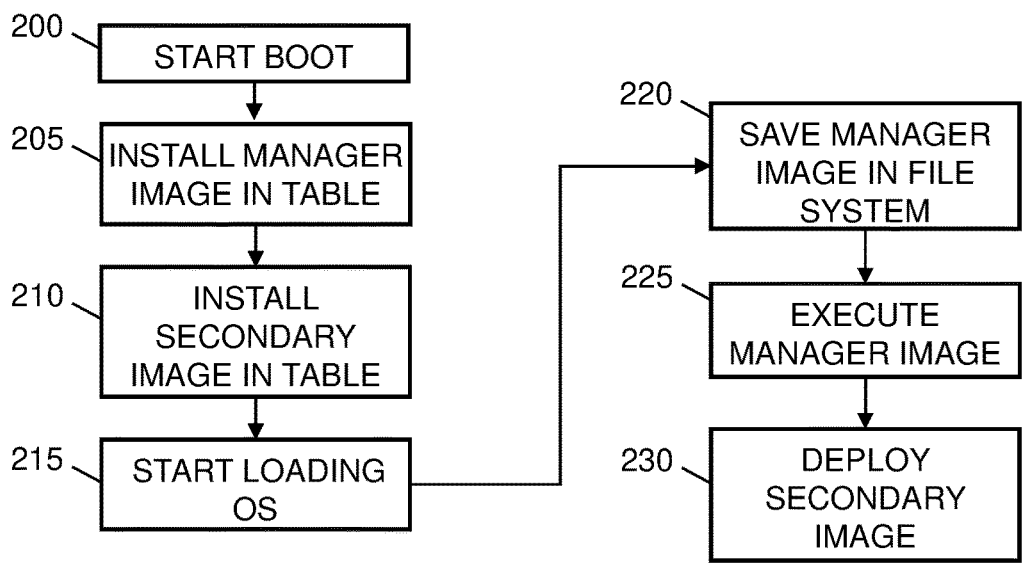
FIG. 5 is a flowchart for the steps of another process for publishing multiple binaries, according to an embodiment of the present invention.

Referring to FIG. 5, booting of the device is started in step 200. In step 205, the manager image is installed from the firmware into the configuration table. In step 210, one or more secondary images are installed from the firmware into the configuration table. In step 215, the operating system starts to load. In step 220, the manager image is copied into the file system of the operating system of the device.

In step 225, the manager image that was copied into the file system is executed. In one embodiment, the Windows Session Manager deploys the manager image by first saving it into a file and then loading and executing it as a process, while the OS is loading. Other OSes may choose to load the manager image directly or by a different method. The main requirement is that the OS follows a specification that leads to launching the manager binary image that has been published by the firmware. The manager image then deploys the secondary images for that OS. In step 230, execution of the manager image leads to the deployment of one or more of the secondary images.

In another embodiment, the firmware and OS are configured to agree on a shared media type, where the firmware places the manager and agents, or even just one binary. The firmware and OS also agree on the format of the executable and configuration data. In this way, the FW generates the content (e.g. a configuration table) and the OS picks it up and loads it. One requirement is that the media is easily accessible by both the FW and the OS.

In other embodiments, the configuration table may be created on disk, in firmware or in other media.

The invention claimed is:

1. A method for publishing multiple binary images from firmware in an electronic device to an operating system in the electronic device, the method comprising:
during booting of the electronic device, the steps of:
installing a first binary image, which is stored in the firmware, into a configuration table in the electronic device;
installing a second binary image, which is stored in the firmware, into the configuration table; and
saving a copy of the first binary image in a file system of the operating system; and
after the operating system has started loading, the step of executing the copy of the first binary image to deploy the secondary binary image.

2. The method of claim 1, wherein the first binary image deploys the second binary image by:
copying the second binary image to the file system; and
launching the second binary image.

3. The method of claim 2, wherein the first binary image launches the second binary image as a child process of the first binary image.

4. The method of claim 1, wherein the first binary image deploys the second binary image by launching the second binary image from the configuration table.

5. The method of claim 4, wherein the first binary image launches the second binary image as a child process of the first binary image.

6. The method of claim 1, wherein the configuration table is in firmware.

7. The method of claim 1, wherein the configuration table is on a disk.

8. The method of claim 1, wherein the deployed second binary image runs until the electronic device is switched off or rebooted.

9. The method of claim 1 comprising, during the booting of the electronic device, installing one or more further binary images, which are stored in the firmware, into the configuration table.

10. The method of claim 1, wherein the first binary image allocates memory for execution, copies the second binary image into the allocated memory, and executes the second binary image.

11. The method of claim 10, wherein the first binary image executes the second binary image by requesting the operating system to start the second binary image as a process.

12. The method of claim 1, wherein the second binary image has a Data memory attribute in the configuration table.

13. The method of claim 1 comprising, when the second binary image is deployed, the second binary image initiates a network connection from the electronic device to a server.

14. The method of claim 13, wherein the server uses one or more remote procedure calls to:
load a third binary image from the server to the electronic device; and
launch the third binary image.

15. The method of claim 1, wherein the second binary image is a script.

16. The method of claim 1, wherein the second binary image comprises one or more registry entries.

17. The method of claim 1, wherein the second binary image is configuration data.

18. The method of claim 1, wherein the first binary image executed while the operating system is loading, by:
saving the first binary image to a file;
loading the first binary image into memory; and
executing the first binary image as a process.

19. An electronic device that publishes multiple binary images, the electronic device comprising:
a processor;
an operating system; and
firmware storing computer readable instructions, which, when executed by the processor cause the electronic device, during booting of the electronic device, to:
install a first binary image, which is stored in the firmware, into a configuration table in the electronic device;
install a second binary image, which is stored in the firmware, into the configuration table; and
save a copy of the first binary image in a file system of the operating system;
and, after the operating system has started loading, execute the copy of the first binary image to deploy the secondary binary image.

20. The electronic device of claim 19, wherein the first binary image deploys the second binary image by launching the second binary image from the configuration table.

* * * * *